United States Patent [19]
Hellinger

[11] Patent Number: 6,065,286
[45] Date of Patent: May 23, 2000

[54] MODULAR HYDRODYNAMIC COUPLING UNIT FOR INTEGRATION INTO A POWER TRANSMISSION UNIT

[76] Inventor: Walter Hellinger, Otzendorfer Strasse 15, 97980 Bad Mergentheim-Rot, Germany

[21] Appl. No.: 09/041,397

[22] Filed: Mar. 12, 1998

[30] Foreign Application Priority Data

Mar. 12, 1997 [DE] Germany .......................... 197 10 070

[51] Int. Cl.[7] .................................................. F16D 33/00
[52] U.S. Cl. .................................. 60/330; 60/337; 60/363
[58] Field of Search ............................ 60/330, 331, 337, 60/338, 339, 341, 347, 352, 357, 363; 415/216.1; 416/197 C

[56] References Cited

U.S. PATENT DOCUMENTS

| | | | |
|---|---|---|---|
| 2,128,828 | 8/1938 | Klepper ........................................ | 60/337 |
| 2,173,428 | 9/1939 | Salerni ........................................ | 60/361 |
| 2,992,534 | 7/1961 | Sinclair . | |
| 3,306,041 | 2/1967 | Verzolla ..................................... | 60/357 |
| 3,486,336 | 12/1969 | Bilton ........................................ | 60/338 |
| 3,782,514 | 1/1974 | Mueller .................................. | 60/363 X |
| 4,345,884 | 8/1982 | Longiny et al. ........................ | 60/364 X |
| 4,781,020 | 11/1988 | Schust et al. .............................. | 60/337 |
| 5,435,133 | 7/1995 | Schust et al. . | |

FOREIGN PATENT DOCUMENTS

| | | |
|---|---|---|
| 1 189 809 | 1/1967 | Germany . |
| 1 750 311 | 1/1971 | Germany . |
| 34 34 860 | 4/1986 | Germany . |
| 36 10 106 | 3/1987 | Germany . |
| 42 24 728 | 2/1994 | Germany . |
| 196 14 590 | 3/1996 | Germany . |

OTHER PUBLICATIONS

Derwent Computer Abstract of German Publication No. 34 34 860.

Derwent Computer Abstract of German Publication No. 1 96 145 90.

*Primary Examiner*—John E. Ryznic
*Attorney, Agent, or Firm*—Marshall, O'Toole, Gerstein, Murray & Borun

[57] ABSTRACT

A power transmission unit with at least one driving shaft that can be coupled to a driven machine includes a modular hydrodynamic coupling unit. The coupling unit includes at least two blade wheels, which together form at least one toroidal working chamber. The two blade wheels each can be connected non-rotatingly to a hub-like element, which can be connected non-rotatingly with one of the driving shaft or driven shaft. An intermediate hub is disposed between at least one blade wheel and a corresponding hub-like element. The intermediate hub is coupled non-rotatingly to the blade wheel and extends in the axial direction from the blade wheel at least to directly above an axial end wall of the housing of the coupling unit. The intermediate hub is removably securable to the coupling housing. The hub-like element forms at least one axial stop for the intermediate hub when it is mounted in the housing. Also when the intermediate hub is mounted in the housing, it is non-rotatingly connected to the hub-like element in a region of the end of the driving shaft.

39 Claims, 2 Drawing Sheets

MODULAR HYDRODYNAMIC COUPLING UNIT FOR INTEGRATION INTO A POWER TRANSMISSION UNIT

BACKGROUND OF THE INVENTION

1. Field of the Invention

The invention concerns power transmissions and in particular to modular hydrodynamic coupling units for integration into a power transmission unit.

2. Description of Related Technology

Hydrodynamic couplings with a variety of designs and functions for integration into power transmission units, especially for torque transfer between a driving and a driven shaft, are known. The driving shaft can be coupled, at least indirectly, to a drive unit and the driven shaft can be coupled, at least indirectly, with at least one subassembly to be driven, preferably in the form of a gear.

Hydrodynamic couplings are designed to correspond to their purpose or application. They are used in gears, but furthermore, these couplings also can be used as separate torque-transfer devices in drive lines. In the latter case, the coupling usually has its own housing. Such couplings are known, for example, from Voith publications cr135, cr112 and cr252d. These couplings include at least one primary and one secondary blade wheel, which form at least one toroidal working chamber with one another. In the case of a double-coupling design, two toroidal working chambers are present. The primary wheel and the secondary wheel are then each formed from two blade wheels. The two primary blade wheels are non-rotatingly joined together through a cylindrical intermediate element. Both primary and secondary wheels are usually externally supported. When used in mining, the primary and secondary wheels are internally supported, whenever possible. External support means that the primary wheel is supported on the particular shaft through a hub which can be non-rotatingly connected to the driving shaft and the secondary wheel is supported on the particular shaft through a hub that can be non-rotatingly connected to the driven shaft. The hub itself consists essentially of a sleeve-shaped element, which, in the simplest case, is secured against axial displacement in the axial direction with a screw connection. The hydrodynamic couplings may include a housing, which has two axial end walls. The axial end walls cover at least one part of the extent of the housing in the radial direction. In the built-in position of the hydrodynamic coupling, the hub extends substantially to the region of the axial end walls. Furthermore, such couplings may include means for cooling the operating material during the operation of the hydrodynamic coupling. For this purpose, the heated operating fluid can flow down on the periphery of the primary wheel through nozzles. The heated operating fluid is collected in a dish assigned to the primary wheel. This dish also is non-rotatingly coupled with the primary wheel. A pressure tube, which is oriented against the direction of rotation and penetrates into the dish, takes up the heated operating fluid. The flow energy of the fluid is sufficient to feed it again into the coupling through a cooler. In couplings designed in this way, it is difficult to use the coupling as a complete pre-mounted modular unit in power transmission devices and, furthermore, to provide simple mounting of the components on the driving and driven side. Above all, in designs with two toroidal working chambers (externally or internally supported), there is a need to mount the individual parts of the coupling modular unit one after another.

SUMMARY OF THE INVENTION

It is an object of the invention to overcome one or more of the problems described above. It also is an object of the invention to avoid the disadvantages of the state of the art, especially, it should be made possible to provide a complete pre-mounted modular coupling unit, especially a modular coupling unit with additional devices, for example, pressure tube or suction tube as a completed pre-mounted unit and thus to integrate the unit in a simple manner into a power transmission system and to change the unit easily in case of problems. The expenditure for construction and for the coupling units as well as the costs should be kept low.

According to the invention, a power transmission unit with at least one driving shaft that can be coupled to a driven machine includes a modular hydrodynamic coupling unit. The coupling unit includes at least two blade wheels, which together form at least one toroidal working chamber. The two blade wheels each can be connected non-rotatingly to a hub element, which can be connected non-rotatingly with one of the driving shaft or driven shaft. An intermediate hub is disposed between at least one blade wheel and a corresponding hub element. The intermediate hub is coupled non-rotatingly to the blade wheel and extends in the axial direction from the blade wheel at least to directly above an axial end wall of the housing of the coupling unit. The intermediate hub is removably securable to the coupling housing. The hub element forms at least one axial stop for the intermediate hub when it is mounted in the housing. Also when the intermediate hub is mounted in the housing, it is non-rotatingly connected to the hub element in a region of the end of the driving shaft.

Other objects and advantages of the invention will be apparent to those skilled in the art from the following detailed description taken in conjunction with the drawing figures and the appended claims.

DETAILED DESCRIPTION OF PREFERRED EMBODIMENTS

Figure 1:
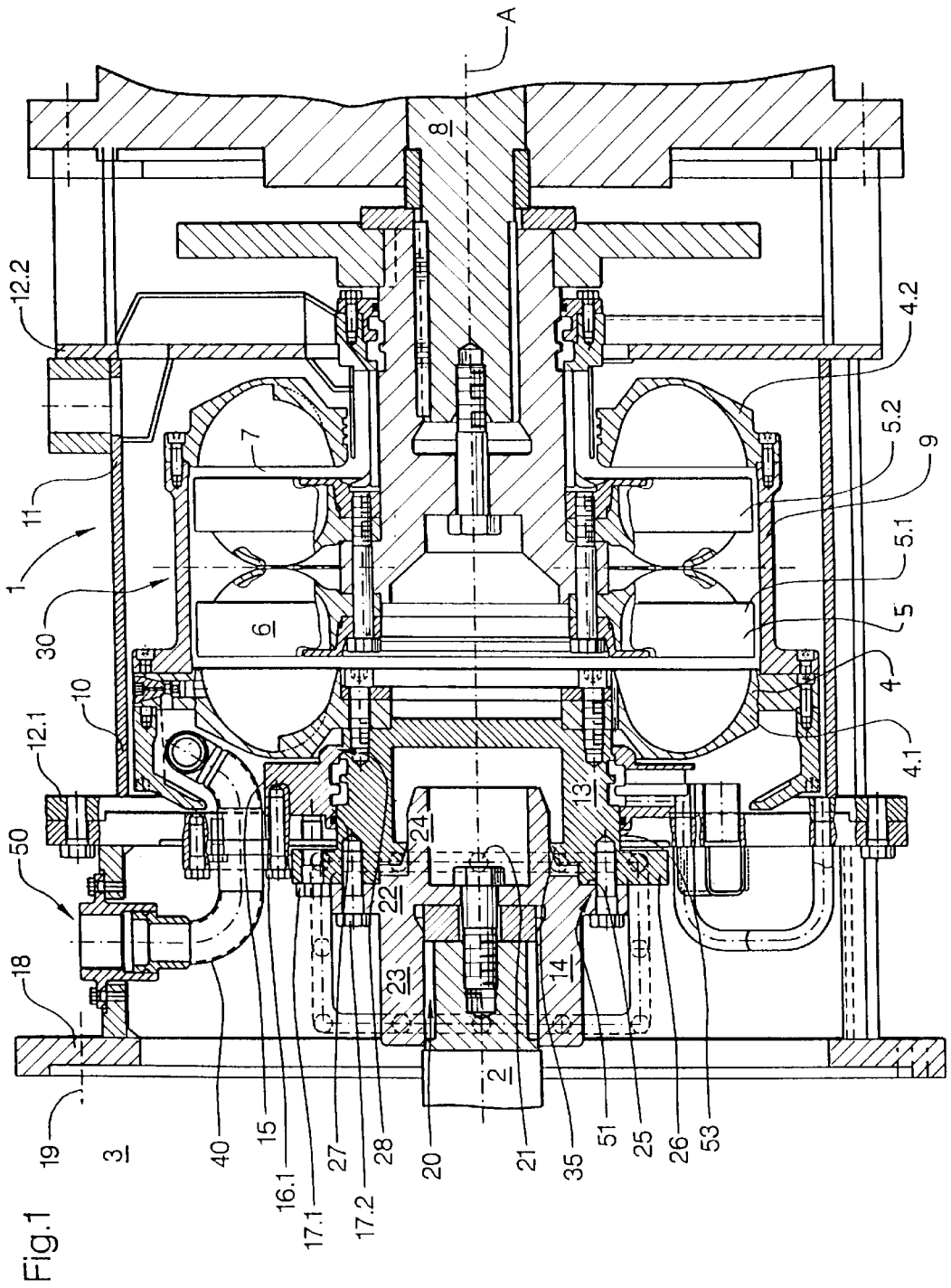
FIG. 1 is an axial cross-sectional view of a hydrodynamic coupling unit according to the invention.

According to the invention, a power transmission unit has a driving shaft which can be coupled to a driving machine, at least indirectly, a driven shaft and a modular hydrodynamic coupling unit, including at least two blade wheels, which are supported on a hub-like element, non-rotatingly connected to the driving shaft and driven shaft, and has an intermediate hub between at least one blade wheel and the corresponding hub-like element. The intermediate hub can be non-rotatingly coupled with the blade wheel and extends from the blade wheel in the axial direction, at least to directly above the axial end walls. Means are provided with which, in the unmounted state of the modular coupling unit into the power transmission unit, the intermediate hub is removably secured on the housing. The hub-like element forms at least one axial stop for the intermediate hub in the mounted state. Additional apparatus are provided which, in the mounted state, non-rotatingly connect the intermediate hub with the hub-like element in the region of the end of the shaft which is non-rotatingly connected to the latter.

Preferably, the intermediate hub is disposed between the primary wheel and the hub-like element which is non-rotatingly connected to the driving shaft. According to the invention, it is possible to avoid projection of the shafts, especially of the driving shaft, into the housing. Thus, the expensive realization of a non-rotating joint between the primary wheel and the driving shaft through the hub can be omitted. The non-rotating connection is located outside the coupling housing. In detail, according to the invention, flanging of the complete coupling modular unit is permitted, including the driving rotors on the driving side to a gear. Then, on the driving side, a driving machine, which can, for example, be designed as an electric motor, can be simply mounted and dismounted.

The intermediate hub may include a first rotational-symmetrical element, especially in the form of a tube, and a flange-like end region. The flange-like end region is arranged in the axial direction outside the axial end wall of the housing and the connection to the housing is accomplished by fastening elements, preferably in the form of screw connections.

The hub-like element may be divided into at least two regions—a first region and a second region. The first region includes means for non-rotating connection of the hub-like element to the shaft.

In the second region, an axial stop is formed for the intermediate hub. The axial stop can be formed from at least one part of an end face facing the coupling modular unit in the second region, on which the intermediate hub can be placed with a part of an end face facing the driving machine. However, the stop may be designed by forming a recess in the second region of the hub-like element on the end face that faces the coupling modular unit in the direction toward the driving machine. The surfaces formed by the recess, running essentially parallel to the driving shaft and driven shaft then form an additional stop for the intermediate hub in the radial direction. For this purpose, the intermediate hub has a projection which is complementary to the recess, which, in the built-in position, is also directed toward the driving machine. The recess preferably extends from a diameter which is smaller than the outside diameter of the hub-like element in the second region, to the external periphery of the hub-like element in the second region.

Preferably, the realization of the non-rotating connection of the intermediate hub and hub-like element also occurs in the second region. This is preferably formed with the aid of connecting elements, for example, in the form of screw connections. Preferably, the fastening elements and the connecting elements for providing a non-rotating connection of the intermediate hub and the hub-like element are designed to be of the same type and size. This makes it possible to utilize the connecting elements, which are used to secure the intermediate hub on the housing wall in the unmounted state for the non-rotating connection, that is, during mounting, it is merely necessary to connect the connecting elements. The second region of the hub-like element is preferably designed for this purpose as an essentially disk-shaped element. The disk-shaped elements borders with at least part of its surface on the end face of the shaft that faces the coupling unit.

Furthermore, the hub-like element may have a third region. The third region is then designed as an annular element, with the outside diameter in the third region being smaller than the inside diameter of the intermediate hub. Means are provided for pre-centering of the hub-like element and the intermediate hub. These means include at least one projection arranged in the inside diameter of the intermediate hub, the smaller diameter of the projection being larger than the outside diameter of the hub-like element in the third region.

Such a pre-centering makes it possible, during the mounting process, to produce easy assignment between the primary wheel and the hub which is non-rotatingly connected to the driving shaft.

Preferably, the modular coupling unit also has a device for centering the intermediate hub in the radial and/or axial direction in the housing. The device is formed from at least one element which can be secured on the housing and which has an inside diameter that surrounds the intermediate hub. The element itself is disposed between the blade wheel and the axial end wall. Furthermore, the device for axial and/or radial centering of the intermediate hub has projections in the region of its inside diameter. Complementary projections are formed on the outside diameter of the intermediate hub. These projections are designed in such a way that, when the intermediate hub moves in the axial direction, the projections on the inside diameter of the device form at least one stop. Another stop for the intermediate hub can be provided on the axial end wall of the housing. The device is preferably secured directly on the end wall of the housing.

Preferably, on the side of the intermediate hub, in the axial direction, the housing is guided away from the axial housing end wall and lengthened in a tunnel-like fashion. This makes it possible to surround the connecting point between the intermediate hub, the hub-like element and the driving shaft. This extension preferably has an end region which is designed as a flange. Through-holes or threads are made in the flange to hold the connecting elements for securing on a housing of the neighboring elements, preferably on the housing of the driving machine, for example, an electric motor. The extension of the housing also may contain devices for realizing an exchange of operating fluid, especially heated operating fluid during operation. For example, a suction tube can be guided through this extension through the axial end walls.

An embodiment according to the invention which is especially suitable includes double couplings, that is, couplings with two toroidal working circuits. Also, the intermediate hub may be located between the secondary wheel and the hub-like element that is non-rotatingly connected to the driven shaft. The pump wheel is designated as the primary wheel and the turbine wheel as the secondary wheel. The intermediate hub does not have to be designed as a separate component, but it is also possible to design it together with the blade wheel as one unit.

A modular hydrodynamic coupling unit according to the invention can be pre-mounted. It serves to be used in power transmission units in which the primary blade wheel can be coupled to the driving side, at least indirectly, preferably to the driving machine, and the secondary blade wheel can be coupled to the driven side, as a rule to a user or a torque conversion unit. Furthermore, the modular coupling unit includes a housing which has two axial end walls. The end walls extend in the radial direction at least to a part of the extent of the housing. An intermediate hub is assigned to at least one of the blade wheels, preferably the primary blade wheel, to provide a non-rotating connection to a hub-like element connected non-rotatingly to the driving shaft. This means that the intermediate hub cannot be coupled directly to the component or modular units to be connected, but can be non-rotatingly connected to the hub-like element, this latter element being non-rotatingly connected to the driving shaft. The intermediate hub extends in the axial direction essentially from the connecting point with the blade wheel or blade wheels to at least directly above the axial end wall of the housing. In the pre-mounted coupling modular unit, which is not mounted yet, this intermediate hub can be connected to the housing removably. Preferably, for this purpose, the intermediate hub is designed as a rotational-symmetrical element with a flange-like end region. This end region, which is designed as a flange, is disposed outside the coupling housing. The removable connection is preferably realized with the aid of screw connections. In the flange-like end region, either through-holes or threaded bores are provided for this purpose. The same applies to the housing and to the axial end walls of the housing. Furthermore, in the region of the axial end walls, a device is provided which makes it possible to attach the intermediate hub in the unmounted state in the axial and/or radial direction. Preferably, an annular element is firmly disposed on the housing end wall for this purpose. This annular element surrounds the intermediate hub. For the purpose of centering, corresponding recesses and projections are provided both on the intermediate hub as well as on the annular element. These are designed and arranged with respect to one another in such a way that the corresponding play can be adjusted in the axial and/or radial direction. Furthermore, according to the invention, means are provided in the end region on the intermediate hub, with the aid of which it is possible to make a connection to the driving shaft or to a hub-like element non-rotatingly connected to the driven shaft. Preferably, the non-rotating connection of the intermediate hub to the corresponding hub-like element to be connected to the driving shaft—or to a shaft to be driven—is accomplished with the aid of screw connections. Preferably, the through-holes or the threaded bores cooperating with the screw connection have the same dimensions as the through-holes previously discussed. As a result, it is possible to use the same connecting elements for the connection between the intermediate hub and the coupling housing in the unmounted state of the modular coupling unit and for the connection between the intermediate hub and the hub in the mounted state when it is integrated into the modular coupling unit in a power transmission unit. The pre-mounted modular coupling unit according to the invention can be integrated simply into a power-transfer unit. It is possible to provide additional functioning elements which are also used completely pre-mounted in the modular coupling unit. This includes, for example, providing a pressure tube or suction tube, which is engaged in a coupling channel. In detail, the design with the intermediate hub can be done on the primary as well as on the secondary blade wheel.

In order to integrate the modular unit into a power transfer unit, the only thing needed is a hub-like element which is non-rotatingly connected to the driving shaft or the driven shaft. The intermediate hub, which is, for example, connected to the housing, preferably to the axial end wall of the housing during transportation, and is centered in the axial end wall as well as in the annular element, can be shifted in the axial direction of the driving machine or of the machine to be driven after the connection to the housing is removed. In each individual case, it depends on whether the second intermediate hub is assigned only to the primary blade wheel or to the secondary blade wheel or to both blade wheels. In case of assignment of the intermediate hub to the primary blade wheel, after removing the connection to the housing, it can be shifted axially in the direction of the driving machine. The connection of the driving machine is accomplished as follows: the hub-like element is pulled onto the driving shaft of the driving machine and is secured axially with the aid of at least one connecting element in the axial direction. Preferably, this axial fastening is performed with removable screw connections. The non-rotating connection between the hub-like element and the driving shaft of the driving machine is realized, for example, with the aid of a feather key connection or a splined shaft connection. The hub-like element itself surrounds at least two annular elements which are connected to one another with intermediate disks. A first annular element serves to provide non-rotating connection to the driving shaft of the driving machine. The second annular element serves to fix the position of the coupling modular unit with respect to the driving machine. While the first annular element preferably serves to realize the non-rotating connection between the hub and the driving shaft of the driving machine, the intermediate disk preferably assumes the function of providing connections between the hub-like element and the intermediate hub. In a preferred embodiment, the intermediate disk also is designed in a flange-like manner and forms a stop for the intermediate hub. Furthermore, the intermediate disk serves to hold the connecting elements for realizing the connection between the hub-like element and the intermediate hub. This is preferably realized with the aid of screw connections. For this purpose, the intermediate disk has either through-holes or threaded bores. In order to fix the position of the modular coupling unit with respect to the driving machine, the hub-like element has a smaller outside diameter than the inside diameter of the intermediate hub over its entire length, that is, extending in the axial direction. On the other hand, it is also conceivable to realize this attachment with a corresponding design of the annular element through a partial region with a larger diameter than the smallest outside diameter of the intermediate hub. However, in such an embodiment, the design of the intermediate hub is more complicated since the intermediate hub would have to have another annular element in an inner space thereof, the outside diameter of this element being smaller than the inside diameter of the hub-like element in the third region. Thus, a tubular element of smaller diameter is to be provided in the intermediate hub.

Furthermore, in order to provide pre-centering, projections are provided on the inner periphery of the intermediate hub or, in the embodiment disclosed above, on the outer periphery of the intermediate hub, or on the outer periphery of the second annular element of the hub-like element. For example, for this purpose, the driving machine, with the hub-like element pulled onto it, is moved to the modular coupling unit and is preadjusted through this pre-centering. The removable connection between the intermediate hub and the housing and between the axial end wall is removed, respectively, and the intermediate hub is brought in the axial direction with respect to the hub-like element into a position in which the flange-like end region lies against the intermediate disk of the hub-like element. When this stop is reached, the non-rotating connection between the hub-like element and the intermediate hub is made. For this purpose, preferably, the same connecting elements are used as in the connection between the intermediate hub and the housing. Due to the design of the intermediate hub of the device for the axial and/or radial centering of the intermediate hub, as well as of the hub-like element, through the axial movement of the intermediate hub during the assembly, a radial and axial play arises in the direction of the driving machine.

The coupling housing has a tunnel-like extension, preferably in the direction of the driving machine. This extension can also be remounted. In the built-in (i.e. mounted) state, it extends in the axial direction beyond the axial extension of the hub-like element. After complete assembly of the coupling modular unit and the driving machine, the tunnel-like extension is connected with the housing of the driving machine.

Embodiments according to the invention are suitable both for use on the primary as well as on the secondary blade wheel, that is, for the connection to the driving shaft, for example, of the driving machine and/or to the driven shaft, for example, of the gear input shaft.

Figure 2:
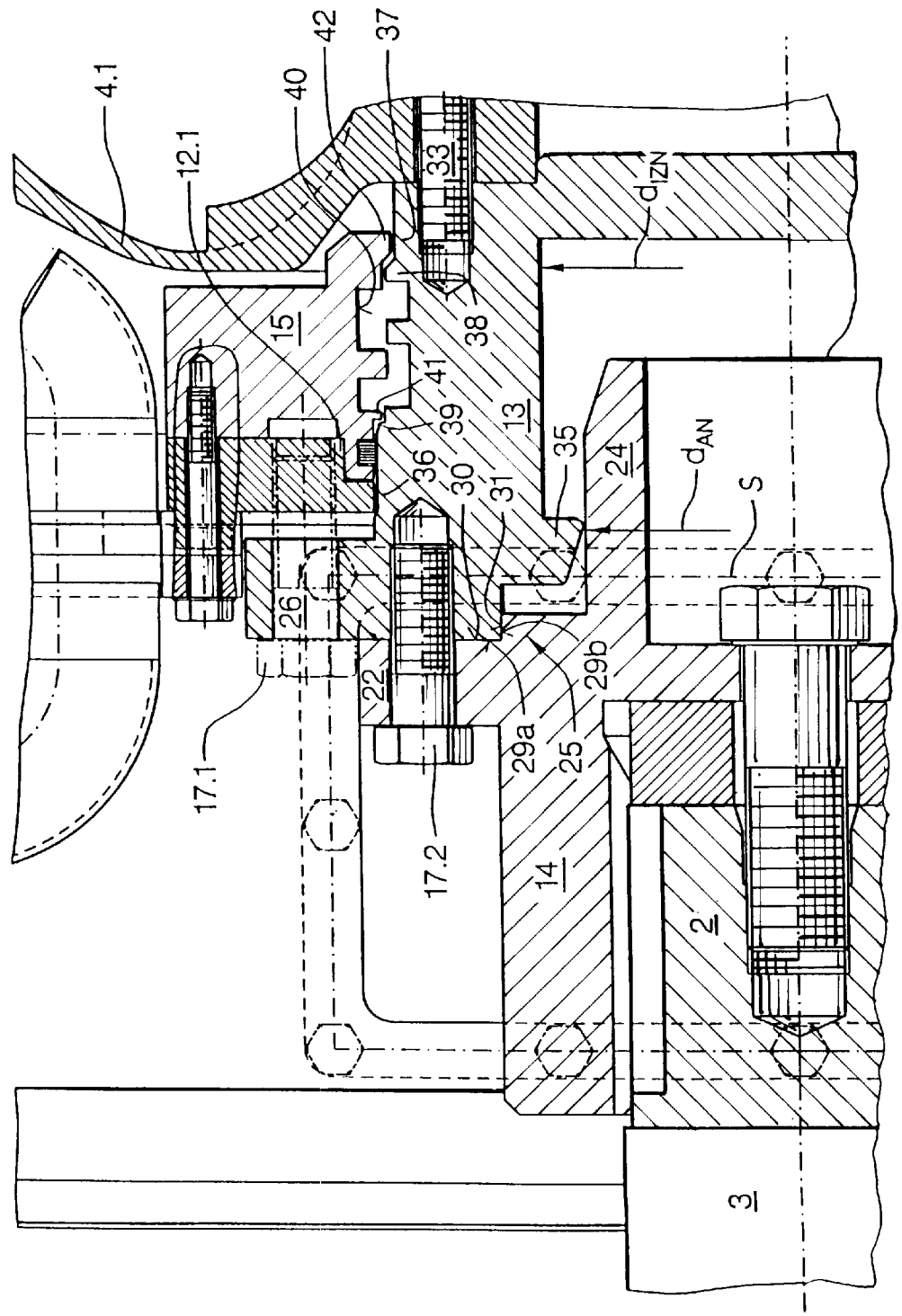
FIG. 2 is an enlarged axial cross-sectional view of a portion of the unit shown in FIG. 1.

The invention is further explained below with the aid of figures. FIG. 1 shows a hydrodynamic coupling unit with the aid of a section of a power transfer unit in an axial cross-section, the coupling unit being coupled to a driving shaft; FIG. 2 shows a detail of FIG. 1.

FIG. 1 shows a hydrodynamic coupling unit 1 in a section of a power transfer unit in axial cross-section, in the built-in (i.e. mounted) position, coupled with a driving shaft 2 of a driving machine 3, which is not shown here in detail. The hydrodynamic coupling modular unit 1 includes a coupling unit 30 with at least one primary wheel 4 and a secondary wheel 5. The coupling unit 30 is designed here as a double coupling, that is, it has two toroidal working chambers—a first working chamber 6 and a second working chamber 7. The first toroidal working chamber 6 is formed by a first primary blade wheel 4.1 (also identified as 4) and a first secondary blade wheel 5.1 (also identified as 5). The second toroidal working chamber 7 is formed by a second primary blade wheel 4.2 and a second secondary blade wheel 5.2. The two primary blade wheels 4.1 and 4.2 are driven at least indirectly by the driving shaft 2 of the driving machine 3, which is not shown here in detail. The two secondary blade wheels 5.1 and 5.2 are non-rotatingly connected to a driven shaft 8. The two primary blade wheels 4.1 and 4.2 are non-rotatingly connected to one another by a cylindrical section 9.

The modular hydrodynamic coupling unit 1 has a housing 10. The housing 10 includes a peripheral wall 11, which is substantially concentric with a coupling axis A as well as two end walls 12.1 and 12.2, which are essentially disk-shaped and which extend in the radial direction along at least a part of the radial dimension of the housing 10.

The primary wheel 4 or the primary blade wheel 4.1 is coupled through an intermediate hub 13 to a hub element 14, which is non-rotatingly connected to the driving shaft 2 of the driving machine 3. Furthermore, an annular component 15 is provided, which is connected to the wall of the housing, preferably to an end wall 12.1, with screw connection 16. The intermediate hub 13 can be connected to the housing or to the end wall 12.1 and the hub 14 with fastening means, for example, screw connections, 17.1 and 17.2.

A flange 18 is provided to fasten the coupling housing 10 on the drive machine, especially an electric motor. This flange 18 can be fastened on the housing of the driving machine with the aid of a screw connection 19. The flange 18 is then attached to the axial-direction tunnel-like extension 50 of the housing 10. This tunnel-like extension 50 extends in the axial direction in the mounted state of the coupling module unit 1, preferably into the region of the connection of the intermediate hub 13 with the driving shaft 2.

The hub element 14 can be non-rotatingly connected to the driving shaft 2 of the driving machine 3. This connection can be realized, for example, as shown here, with the aid of a feather key connection 20. The hub element 14 has a sleeve-like design and includes two annular elements connected to one another with the aid of a separating disk 22—a first annular element 23 and a second annular element 24. As shown here by way of example, the hub 14 can be attached to the driving shaft 2 in the axial direction with the aid of a screw connection 21. The intermediate disk 22 is designed in such a way that it forms a flange 51 to hold the connecting elements for coupling with the intermediate hub 13.

Furthermore, the intermediate disk 22 is designed in such a way in the transition to the second annular element 24 that this forms a stop for a part of the outer boundary of the intermediate hub 13. This stop is designated here with a reference numeral 25. The second annular element has a smaller outside diameter $d_{AN}$ in a region surrounding the hub 14 in comparison to the smallest inside diameter $d_{Izn}$ of the intermediate hub 13. The smallest inside diameter $d_{Izn}$ is formed by the creation of a projection 35 directed in the direction of an axis of symmetry S. This projection 35, when viewed in the axial direction, is in the end region of the intermediate hub 13, preferably in the region of the flange-like end 26 of the intermediate hub 13. This second annular element 24 of the hub element 14 serves to cooperate with the intermediate hub 13 for pre-centering.

The intermediate hub 13 is designed substantially like a sleeve. An end 26 of the hub 13 which faces in the direction of the driving machine when built in, also is designed like a flange. This end 26 or flange is designed so that it can be made to lie at the stop 25 of the hub 14. Furthermore, the intermediate hub 13 is designed on its outer periphery 53 in the region of the flange-like end 26 in such a way that it forms at least two fits with the annular component 15. As shown in the drawing, these are fits 27 and 28.

In the built-in state (i.e. mounted), the intermediate hub 13 is shifted with respect to the hub element 14 non-rotatingly supported on the driving shaft 2 in the axial direction in such a way that, as shown in detail in FIG. 2, the flange-like end 26 of the intermediate hub 13 lies with surfaces 29$a$ and 29$b$ against the intermediate disk 22 forming a flange, at surfaces 30 and 31. The stepwise transition from the intermediate disk 22 to the second annular element 24 of the hub 14 is also designated as the stop 25. Fastening in the axial as well as in the radial direction is accomplished with the aid of a screw connection 17.2. In the built-in state, the screw connection 17.1 is open, that is, there is no connection or fastening of the intermediate hub 13 to the end wall 12.1.

In the dismounted state, that is, before building in (i.e., mounting), the modular coupling unit 1 is in a form in which the first primary blade wheel 4.1 is non-rotatingly connected to the intermediate hub 13 through a screw connection 33. Furthermore, the intermediate hub 13 is fastened on the end wall 12.1 with the screw connection 17.1. For this purpose, the intermediate hub 13 extends in the axial direction beyond the end wall 12.1. In the region of the end 26, which is preferably designed in a flange-like fashion, there are possibilities for realizing a separable connection with the end wall 12.1. Preferably the connection is made with the aid of screws 17.1.

Furthermore, in the pre-mounted state, the coupling unit 30 is centered in the axial and radial direction at least by the end wall 12.1. Preferably, an annular centering device or component 15 is provided which is firmly connected with the end wall 12.1.

In the pre- or un-mounted state, this unit described above, forms the modular pre-mounted coupling unit 1.

Another component of the pre-mounted modular coupling unit may be a flange 18 which is designed for the purpose of connecting the coupling housing 10 with a housing of the driving machine 3, this flange 18 joining to the end wall 12.1, with a tunnel-like extension 50 being provided between the flange 18 and the end wall 12.1 in the form of an essentially cylindrical tube.

For incorporation into a drive string, especially of the coupling between the hydrodynamic coupling and the driving machine 3, which can be, for example, in the form of an electric motor, the hub element 14 is pulled onto the driving shaft 2. The hub 14 is then fixed in the axial direction with respect to the driving shaft. The pre-mounted modular coupling unit 1 is then brought in position with respect to the hub 14, preferably with the second annular element 24 of the hub 14, in such a way that the sleeve-like intermediate hub 13, which has a larger inside diameter $d_{Izn}$ than the outside diameter $d_{AN}$, partly surrounds the hub 14 or the second annular element 24 of the hub 14.

On its inside periphery, that is, on the inside diameter $d_{Izn}$ the intermediate hub 13 preferably has an annular projection 35, which serves essentially to fulfill the task of pre-centering between the two elements, the hub element 14 and the intermediate hub 13. A design with a plurality of individual projections distributed around the periphery, extending over a small part of the periphery on the inside diameter $d_{Izn}$ of the intermediate hub 13, is also conceivable. In such an embodiment, the driving machine 3 is driven onto the coupling modular unit and preadjusted through such pre-centering. After they are completely brought together, the driving machine 3 is attached to the flange 18 of the coupling modular unit with the aid of screw connections 19. After that, the screw connections 17.1, which connect the intermediate hub 13 with the end wall 12.1 or secure these on the end wall 12.1 are removed and are screwed into the intermediate hub through the through-holes provided in the hub element 14, preferably in the intermediate disk 22. This screw connection is designated with the reference numeral 17.2. Preferably, these are the same size as for the connection between the intermediate hub 13 and the end wall 12.1, so that the same screws, after removal, can be used again for the connection between the hub 14 and the intermediate hub 13. By tightening the screw connection 17.2, the intermediate hub 13 and the part attached to it, preferably the primary wheel 4.1 of the modular hydrodynamic coupling unit 1, are moved in the direction of the driving machine 3. As a result of the axial movement of the intermediate hub 13 in the direction of the driving machine 3, a radial and axial play develops between the intermediate hub 13 and the end wall 12.1 and between the annular component 15 firmly connected to the housing, that is, to the end wall 12.1 in the region of the fits 36 and 37. When the intermediate hub 13 butts with its surface 29a against the surface 30 of the hub 14, the screw connections 17.2 are tightened with a definite tightening torque so that torque can be introduced from the drive machine 3 through the driving shaft 2, the hub 14, and the intermediate hub 13 into the coupling, that is, into the primary wheel 4.

In the unmounted state of the modular coupling unit 1, the intermediate hub 13 is fastened on the end wall 12.1 with the aid of screw connections 17.1. In the axial direction, the intermediate hub 13 assumes such a position with respect to the annular component 15 that component 15 forms a stop for the intermediate hub 13 in the radial and possibly in the axial direction. For this purpose, projections and recesses are provided on the outside periphery of the intermediate hub shown in the drawing as a projection 38 and a recess 39, and on the inside periphery 40 of the annular component 15, complementary projections and recesses 41 and 42 are provided. When these engage, they form a stop for the movement of the intermediate hub 13 and for the components connected to the hub 13 in the radial direction and possibly also in the axial direction with a corresponding design.

The degree of fit, especially in the region of the individual stop, can be designed corresponding to the requirements of assembly. In detail, for example, by loosening the screw connections 17.1 on the modular coupling unit 1, which is not yet mounted, the intermediate hub 13 can be moved in the axial direction of the driving machine 3. After a few millimeters of axial movement, the surfaces 31 and 29b will lie on top of one another. When the intermediate hub 13 is moved further in the direction of the driving machine 3, the fit 37 becomes inactive. Again, after axial movement of the intermediate hub 13 in the direction of the driving machine 3, the fit 36 also becomes ineffective. Individually and alone, the surfaces 29b of the intermediate hub 13 and 31 of the hub 14 are still being used. When the intermediate hub 13 is moved further in the axial direction, that is, in the direction of the driving machine 3, the surfaces 30 of the hub 14 and the surface 29a of the intermediate hub 13 will lie against one another. Only the surfaces 30 and 31 are in contact with the surfaces 29a and 29b.

The fit lengths described here and shown in detail in FIGS. 1 and 2 as well as the sequence of their deactivation and activation is considered here only as an example. The sequence of activation and deactivation can be varied. It is foreseen that the design of the outside periphery of the intermediate hub 13, of the inside periphery of the intermediate hub 13, of the outside periphery in the region of the attachment surface of the intermediate hub 13 onto the hub 14 and the inside diameter of the end wall 12.1 as well as the component 15 connected to this can be designed differently. The only essential thing is that, when the modular coupling unit 1 is in the unmounted state, the intermediate hub 13 is fastened onto the end wall 12.1 or on the housing wall of the modular hydrodynamic coupling unit 1, and is fixed in the axial direction with regard to displaceability in the direction of the driven assembly. The attachment can be done by appropriate design of the housing wall or with the aid of a component that is firmly attached to the housing. The specific design of the individual components is then up to the technical knowledge of the person of ordinary skill in the art.

In order to prevent jamming of the intermediate hub 13 during the axial movement, the individual fits are always chosen in such a way that they can always assume any deviations from concentricity and assume the tolerances of the diameter. Especially, the fits are designed in such a way that they can assume the sum of the tolerances of the individual components.

FIG. 2 illustrates a detail of an embodiment according to FIG. 1. Here, the possible attachments, especially the possible attachment between the hub 14 and the intermediate hub 13 or between the intermediate hub 13 and the end wall 12.1 of the housing must be provided. The possible connections or possible fastening are preferably produced by screw connections.

The embodiment of the invention shown in the drawing figures is a double coupling, that is, of a coupling with two working cycles. Additionally, this can also be supported externally with regard to the driven side. Furthermore, it is conceivable to provide this possibility of outside support of the primary blade wheel 4 through the intermediate hub 13 on its hub 14 non-rotatingly connected to the driving shaft in the case of simple, single-circuit hydrodynamic couplings. Especially, such modular units, which also may have the corresponding additional devices, for example, as it is shown here in FIG. 1, a vertical suction tube 40, as pre-mounted modular coupling units. An advantage of such a pre-mounted structure consists in reduction of the assembly expense during mounting. Furthermore, there is a possibility to replace complete modular coupling units in their entirety, rapidly and without any problems. The individual design of the possible axial displacement paths as well as the fits in these areas is up to the knowledge of the individual expert in the case of this design.

The foregoing detailed description is given for clearness of understanding only, and no unnecessary limitations should be understood therefrom, as modifications within the scope of the invention will be apparent to those skilled in the art.

I claim:

1. A modular hydrodynamic coupling unit for use in a power transmission unit connected to a driving machine, the coupling unit for the transfer of torque between a driving shaft and a driven shaft, the coupling unit comprising:
   a) a primary blade wheel and a secondary blade wheel which form together a toroidal working chamber;
   b) a hub element non-rotatingly connected to each of the blade wheels, the hub element non-rotatingly connectable to the driving shaft and the driven shaft and secured against axial displacement;
   c) a housing with two axial end walls which extend at least along a part of a radial dimension of the housing;
   d) an intermediate hub disposed between at least one of the blade wheels and the hub element, the intermediate hub being non-rotatingly coupled to at least one of the blade wheels, the intermediate hub extending from the blade wheels in the axial direction at least to a location above one of the axial end walls;
   e) means for removably securing the intermediate hub in the housing, the hub element forming at least one axial stop for the intermediate hub when the intermediate hub is mounted in the housing; and
   f) means for non-rotatingly connecting the mounted intermediate hub with the hub element in a region of an end of the driving shaft.

2. The coupling unit of claim 1 wherein the intermediate hub is disposed between the primary blade wheel and the hub element, the hub element being non-rotatingly connected to the driving shaft.

3. The coupling unit of claim 1 wherein
   a) the intermediate hub comprises a first rotation-symmetrical element and a flange-like end region disposed in the axial direction outside one of the axial end walls; and
   b) the means for removably securing the intermediate hub in the housing comprises fastening elements.

4. The coupling unit of claim 3 wherein the rotational-symmetrical element is a tube.

5. The coupling unit of claim 1 wherein the means for removably securing the intermediate hub in the housing comprises screw connection elements.

6. The coupling unit of claim 1 wherein the hub element is divided into a first region and a second region, the first region including the means for non-rotatingly fastening the hub element on the driving shaft and the driven shaft, the second region having the at least one axial stop for the intermediate hub.

7. The coupling unit of claim 6 wherein the at least one axial stop is formed of at least one part of an end face facing the coupling unit in the second region, against which the intermediate hub is placeable with a part of a second end face facing the driving machine.

8. The coupling unit of claim 7 wherein the end face forming the at least one axial stop and facing the coupling unit is a component of at least one recess in the second region of the hub element in the direction toward the driving machine, and comprising;
   surfaces which run essentially coaxially to the driving shaft and driven shaft, the surfaces also defining recesses and forming a stop for the intermediate hub in the radial direction, the intermediate hub having a projection which is complementary to at least one of the recesses.

9. The coupling unit of claim 8 wherein one of the recesses extends from a diameter which is smaller than the outside diameter of the hub-like element in the second region to the outside diameter of the hub-like element.

10. The coupling unit of claim 6 wherein the second region includes an essentially disk-shaped element, at least part of a surface of the disk-shaped element bordering on a face of the driving shaft or driven shaft facing the coupling unit.

11. The coupling unit of claim 10 wherein the at least one stop is formed by at least one part of a front face of the disk-shaped element facing the coupling unit.

12. The coupling unit of claim 6 wherein the hub element includes a third region designed as an annular element, an outside diameter $d_{AN}$ in the third region is smaller than an inside diameter $d_{Izn}$ of the intermediate hub, and further comprising means for centering the hub element with respect to the intermediate hub.

13. The coupling unit of claim 12 wherein the centering means is a projection disposed on the inside diameter $d_{Izn}$ of the intermediate hub, the smallest inside diameter of the projection being slightly larger than the outside diameter $d_{AN}$ of the hub element in the third region.

14. The coupling unit of claim 1 comprising a centering device disposed in the housing for centering the intermediate hub in at least one of the radial and axial dimensions.

15. The coupling unit of claim 14 wherein the centering device is formed of an element securable on the housing, said element having at least one inside diameter, the element surrounding the intermediate hub and disposed between at least one of the blade wheels and at least one of the axial end walls.

16. The coupling unit of claim 14 wherein the centering device has projections in a region of its inside diameter, the intermediate hub having projections in a region of its outside diameter, the projections provided on the inside diameter of centering device and on the outside diameter of the intermediate hub designed such that when the intermediate hub is moved in the axial direction, the projections on the inside diameter of the centering device form at least one radial stop.

17. The coupling unit of claim 16 wherein the projections on the inside diameter of the centering device form at least two radial stops.

18. The coupling unit of claim 16 wherein another stop is formed on at least one of the axial housing walls.

19. The coupling unit of claim 14 wherein the centering device is secured to one of the housing axial end walls.

20. The coupling unit of claim 14 wherein the centering device is an annular element.

21. The coupling unit of claim 1 wherein the means for non-rotatingly connecting the mounted intermediate hub with the hub element comprises screw connecting elements.

22. The coupling unit of claim 21 wherein the means for removably securing the intermediate hub in the housing comprises screw connecting elements of the same type and same size as the screw connecting elements of the means for non-rotatingly connecting the mounted intermediate hub with the hub element.

23. The coupling unit of claim 1 wherein the intermediate hub is disposed between the secondary wheel and the hub element, the hub element non-rotatingly connected to the driven shaft.

24. The coupling unit of claim 1 wherein the housing includes an extension extending away from one of the axial housing end walls in the axial direction, on the side of the intermediate hub, the extension having a flange-like end region, the flange-like end region having through-holes or threads for accepting connecting elements for fastening on a housing of the neighboring elements.

25. The coupling unit of claim 24 wherein the intermediate hub is disposed between the primary blade wheel and the hub element, the hub element being non-rotatingly connected to the driving shaft and wherein the flange-like end region of the housing, which is extended in the axial direction, is securable to a housing of the driving machine.

26. The coupling unit of claim 24 wherein the intermediate hub is disposed between the secondary blade wheel and the hub element, the hub element being non-rotatingly connected to the driven shaft, the driven shaft being designed as an input shaft of a gear disposed downstream of the coupling unit, the flange-like end region of the housing being securable to the gear housing.

27. The coupling unit of claim 1 wherein the primary blade wheel is a first primary blade wheel and the secondary blade wheel is a first secondary blade wheel and further comprising:

a second primary blade wheel and a second secondary blade wheel which form together a second toroidal working chamber, the first primary blade wheel being non-rotatingly connected to the second primary blade wheel by a cylindrical body.

28. The coupling unit of claim 1 wherein the intermediate hub and the primary blade wheel are made as one unit.

29. A modular hydrodynamic coupling unit for torque transfer between a driving shaft and a driven shaft in a power transmission unit, the coupling unit comprising:

a) a first blade wheel and a second blade wheel which form together a toroidal working chamber, each blade wheel being non-rotatingly connectable to a hub element, the hub element being non-rotatingly connected to one of the driving shaft or the driven shaft and being secured against axial displacement;

b) a housing with two axial end walls extending over at least part of a radial dimension of the housing;

c) an intermediate hub in non-rotating connection with the hub element, the intermediate hub being non-rotatingly coupled to one of the blade wheels, the intermediate hub extending from the coupled blade wheel in an axial direction at least directly above one of the axial end walls;

d) means for removably fastening the intermediate hub to the housing;

e) an attachment surface for a stop provided on the hub element formed by at least a part of an area of the intermediate hub facing away from one of the axial end walls; and f) means for non-rotatingly connecting the intermediate hub with the hub element, said means disposed on the hub element.

30. The coupling unit of claim 29 wherein the intermediate hub includes a first rotation-symmetrical element and a flange-like end region, the flange-like end region being disposed in the axial direction outside one of the axial end walls and wherein the means for removably fastening the intermediate hub to the housing is a fastening element.

31. The coupling unit of claim 30 wherein the rotational-symmetrical element is tubular.

32. The coupling unit of claim 29 wherein the means for removably fastening the intermediate hub to the housing is a screw connection element.

33. The coupling unit of claim 29 further comprising a centering device for centering of the intermediate hub in at least one of the radial and axial directions, the centering device being disposed in the housing.

34. The coupling unit of claim 33 wherein the centering device is formed from an element securable to the housing, the element having at least one inside diameter, the element surrounding the intermediate hub, the element being disposed between one of the blade wheels and one of the axial end walls.

35. The coupling unit of claim 33 wherein the centering device has projections in a region of its inside diameter and wherein the intermediate hub has projections in a region of an outside diameter thereof, the projections provided on the inside diameter of the centering device and the projections provided on the outside diameter of the intermediate hub are designed such that when the intermediate hub is moved in the axial direction, the projections on the inside diameter of the centering device form at least one stop.

36. The coupling unit of claim 35 wherein the projections provided on the inside diameter of the centering device and the projections provided on the outside diameter of the intermediate hub form at least two stops.

37. The coupling unit of claim 35 wherein another stop is formed at one of the axial housing walls.

38. The coupling unit of claim 33 wherein the centering device is fastened onto one of the housing end walls.

39. The coupling unit of claim 33 wherein the centering device is annular.

* * * * *